United States Patent
Oohashi et al.

(10) Patent No.: US 6,735,071 B2
(45) Date of Patent: May 11, 2004

(54) CAPACITOR ASSEMBLY FOR AN ALTERNATOR AND A METHOD FOR THE MANUFACTURE THEREOF

(75) Inventors: Atsushi Oohashi, Tokyo (JP); Yoshihito Asao, Tokyo (JP); Hideki Morikaku, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 102 days.

(21) Appl. No.: 10/189,423

(22) Filed: Jul. 8, 2002

(65) Prior Publication Data

US 2003/0030964 A1 Feb. 13, 2003

(30) Foreign Application Priority Data

Aug. 7, 2001 (JP) .......................... 2001-239562

(51) Int. Cl.⁷ ............................. H01G 4/228
(52) U.S. Cl. ............ 361/306.1; 361/361; 361/301.3; 361/513; 361/519; 361/537; 29/25.41
(58) Field of Search .................. 361/301.3, 513, 361/517, 535, 537, 538; 29/25.41, 25.42

(56) References Cited

U.S. PATENT DOCUMENTS

| 4,459,499 A | | 7/1984 | Bonecker et al. |
| 5,550,415 A | * | 8/1996 | Adachi et al. ............ 310/68 R |
| 6,236,557 B1 | | 5/2001 | Kashihara et al. |

FOREIGN PATENT DOCUMENTS

| FR | 2544581 | 10/1984 |
| GB | 2352565 | 1/2001 |
| JP | 61-154057 | 7/1986 |
| JP | 10-304638 | 11/1998 |
| JP | 2000-209824 | 7/2000 |
| JP | 2001-016829 | 1/2001 |

* cited by examiner

*Primary Examiner*—Anthony Dinkins
(74) *Attorney, Agent, or Firm*—Sughrue Mion, PLLC

(57) ABSTRACT

During molding of a brush holder which is a resin-molded part in an alternator, a capacitor component is molded integrally with a capacitor positive electrode terminal and a capacitor negative electrode terminal joined by crimping to a positive terminal and a negative terminal, respectively. The capacitor component is thereby embedded in a first resin portion.

18 Claims, 10 Drawing Sheets

CAPACITOR ASSEMBLY FOR AN ALTERNATOR AND A METHOD FOR THE MANUFACTURE THEREOF

This application is based on Application No. 2001-239562, filed in Japan on Aug. 7, 2001, the contents of which are hereby incorporated by reference.

BACKGROUND OF THE INVENTION

1. Field of the Invention

The present invention relates to a capacitor assembly for an alternator providing a capacitor component in an interior space of an alternator case, and to a method for the manufacture thereof.

2. Description of the Related Art

Conventionally, in alternators, a capacitor component is connected in parallel between a positive electrode and a negative electrode of the alternator, being constructed mainly to absorb surges generated by a rectifier assembly and to prevent the propagation of noise to vehicle electrical load devices such as audio systems.

The capacitor component is accommodated inside a cup-shaped capacitor receptacle, being integrated with the capacitor receptacle by a filler resin injected inside the capacitor receptacle and hardened. The capacitor assembly is constructed by inserting the capacitor receptacle containing the capacitor component into an insertion aperture disposed through a brush holder which is a rear-end built-in molded part, and joining component terminals to holder terminals by a joining means such as soldering.

In the conventional capacitor assembly constructed in this manner, because the capacitor receptacle containing the capacitor component is supported in the brush holder by means of the joint portions between the component terminals and the holder terminals, the joint portions between the component terminals and the holder terminals bear the weight of the capacitor receptacle, the capacitor component, and the filler resin. When the alternator is mounted to the engine of an automobile, vibrations from the engine are transmitted to the alternator when the engine is running. Thus, the weight of the capacitor receptacle, the capacitor component, and the filler resin becomes a vibrating load acting repeatedly on the joint portions between the component terminals and the holder terminals, and one problem has been the occurrence of dislodging of the joint portions.

In order to solve problems of this kind, capacitor assemblies have been proposed as improvements in Japanese Patent Laid-Open No. 2000-209824 and Japanese Patent Laid-Open No. 2001-16829, for example, in which the weight of the capacitor receptacle, the capacitor component, and the filler resin is prevented from acting on the joint portions between the component terminals and the holder terminals by forming the brush holder and the capacitor receptacle into an integrated body.

Figure 19:
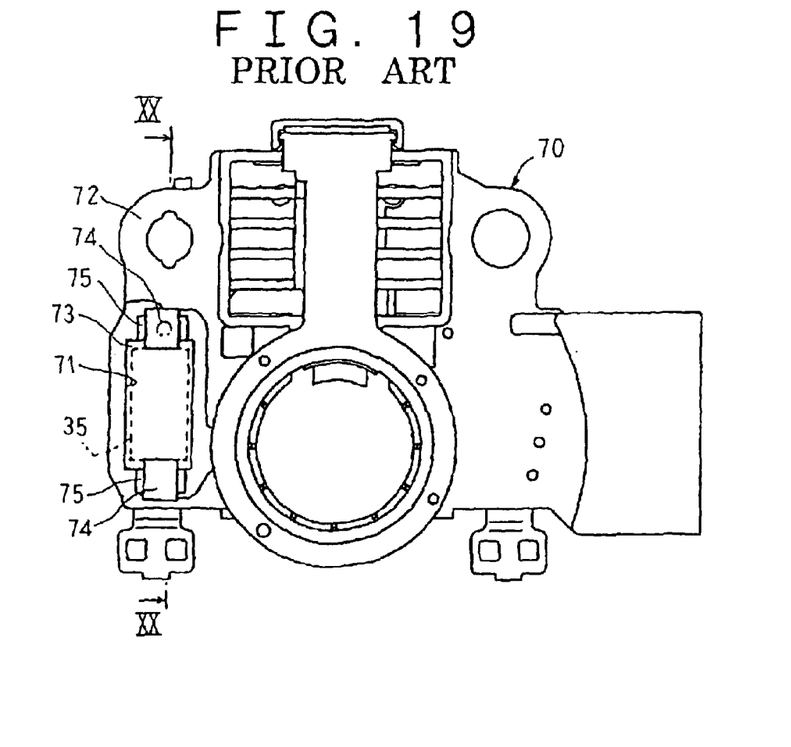
FIG. 19 is a front elevation showing a brush holder of a conventional alternator.
Figure 20:
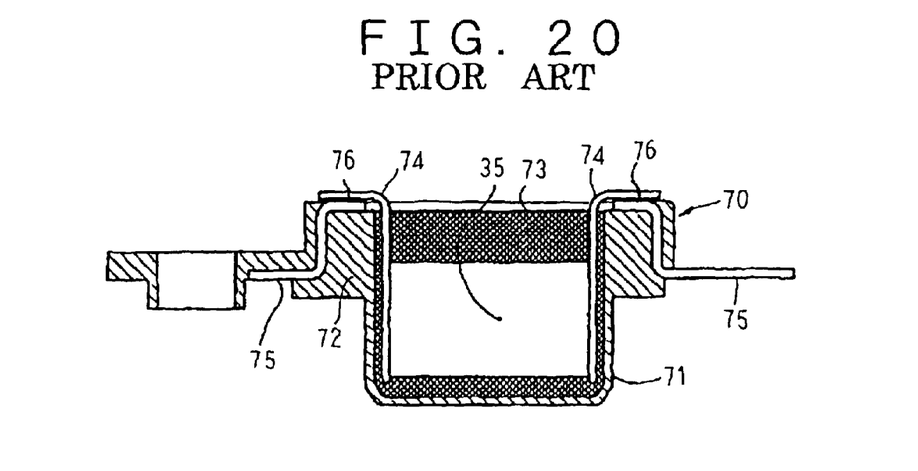
FIG. 20 is a cross section taken along line XX—XX in FIG. 19 viewed from the direction of the arrows.

In these capacitor assemblies proposed as improvements, as shown in FIGS. 19 and 20, a cup-shaped capacitor accommodating portion 71 is formed in a portion of a brush holder 70 when the brush holder 70 is formed by molding using a polyphenylene sulfide (PPS) resin. The capacitor component 35 is accommodated in the capacitor accommodating portion 71, a filler resin 73 composed of an epoxy resin is injected into the capacitor accommodating portion 71 and hardened, and then component terminals 74 are soldered to holder terminals 75.

Thus, the brush holder 70 (the capacitor accommodating portion 71) bears the weight of the capacitor component 35 and the filler resin 73. Hence, the weight of the capacitor component 35 and the filler resin 73 is prevented from becoming a vibrating load acting repeatedly on the joint portions 76 between the component terminals 74 and the holder terminals 75, thereby preventing the occurrence of dislodging of the joint portions 76.

In the conventional capacitor assemblies proposed as improvements, as explained above, a PPS resin and an epoxy resin are used in a resin portion 72 of the brush holder 70 and for the filler resin 73, respectively.

Thus, because the resin portion 72 of the brush holder 70 and the filler resin 73 have differing coefficients of thermal expansion and thermal contraction, one problem has been that the interface between the resin portion 72 and the filler resin 73 separates due to ambient temperature increases or heat received from other heat-generating parts, and salt water, etc., may penetrate the gaps therebetween, giving rise to insulation failure.

Furthermore, in order to secure the capacitor component 35, the capacitor accommodating portion 71 is filled with the filler resin 73, requiring a process for hardening the filler resin 73, and thus another problem has been that manufacturing time is lengthy.

SUMMARY OF THE INVENTION

The present invention aims to solve the above problems and an object of the present invention is to provide a capacitor assembly for an alternator and a method for the manufacture thereof enabling suppression of insulation failure due to penetration by salt water, etc., by molding a capacitor component integrally during molding of resin-molded parts to be mounted to the alternator to prevent separation resulting from ambient temperature increases or heat received from other heat-generating parts, and also enabling manufacturing time to be shortened by omitting processes for filling and hardening a filler resin.

With the above object in view, a capacitor assembly for an alternator of the present invention includes a resin-molded part formed by molding using a first molding resin, a positive terminal and a negative terminal insert molded into the resin-molded part, and a capacitor component installed between a battery terminal end and ground. The resin-molded part is mounted to an alternator case. The capacitor component has a capacitor positive electrode terminal and a capacitor negative electrode terminal for electrical connection to the positive terminal and the negative terminal. The capacitor component is molded integrally into the resin-molded part so as to be embedded in the resin-molded part.

Therefore, there is provided a capacitor assembly for an alternator enabling suppression of insulation failure due to penetration by salt water, etc., by preventing separation resulting from ambient temperature increases or heat received from other heat-generating parts, and also enabling manufacturing time to be shortened by omitting processes for filling and hardening a filler resin to secure the capacitor component.

With the above object in view, a method for manufacturing a capacitor assembly for an alternator of the present invention includes the step of molding a positive terminal, a negative terminal, and a capacitor component using a first molding resin to integrally mold The capacitor component has a capacitor positive electrode terminal and a capacitor negative electrode terminal for electrical connection to the positive terminal and the negative terminal. The capacitor component is installed between a battery terminal end and ground.

Therefore, there is provided a method for manufacturing a capacitor assembly for an alternator enabling suppression of insulation failure due to penetration by salt water, etc., by preventing separation resulting from ambient temperature increases or heat received from other heat-generating parts, and also enabling manufacturing time to be shortened by omitting processes for filling and hardening a filler resin to secure the capacitor component.

DETAILED DESCRIPTION OF THE PREFERRED EMBODIMENTS

The preferred embodiments of the present invention will now be explained with reference to the drawings.

Embodiment 1

Figure 1:
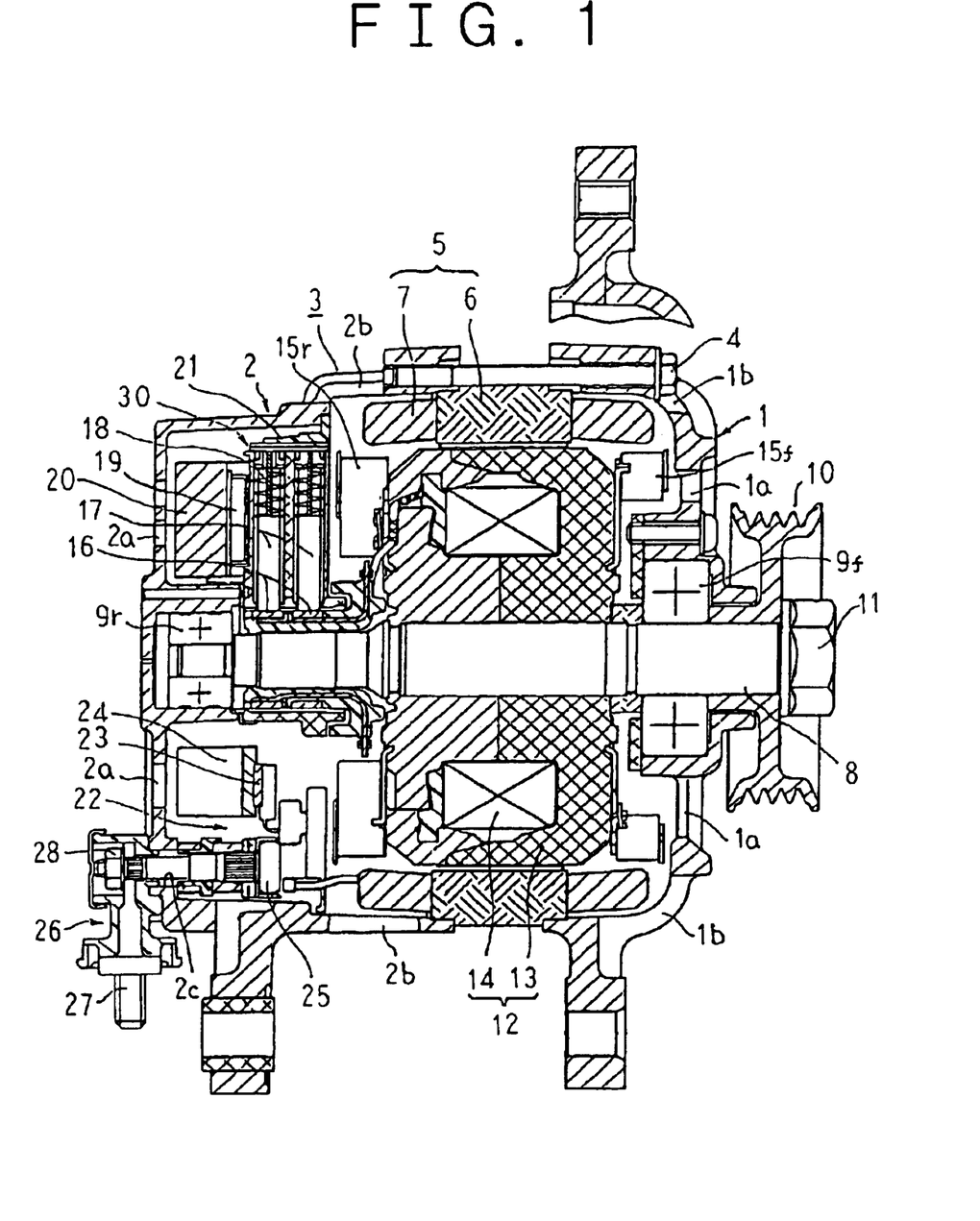
FIG. 1 is a longitudinal section showing an alternator mounted with a capacitor assembly according to Embodiment 1 of the present invention.
Figure 2:
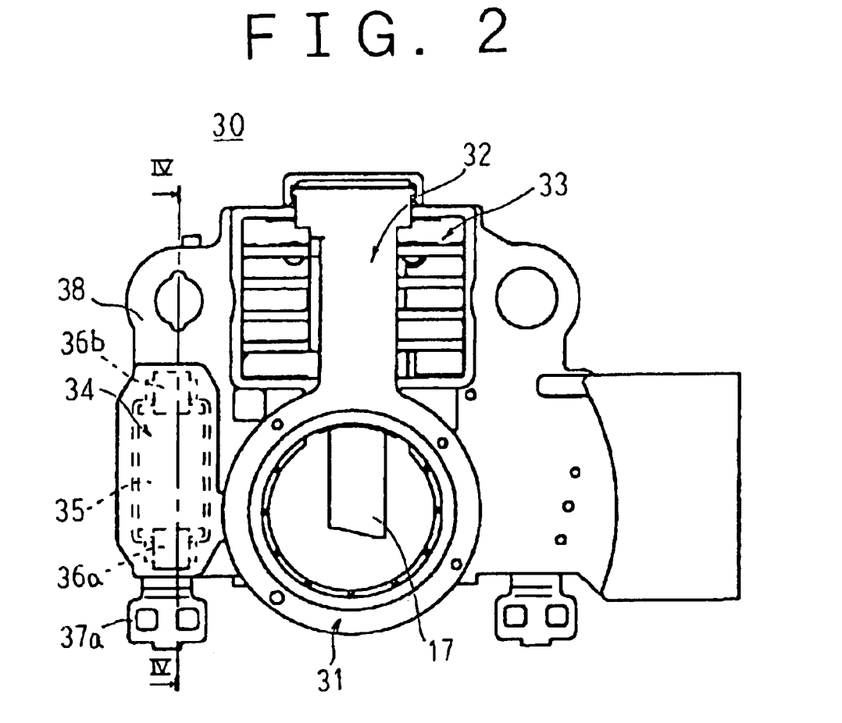
FIG. 2 is a front elevation showing the capacitor assembly for an alternator according to Embodiment 1 of the present invention viewed from a front end.
Figure 3:
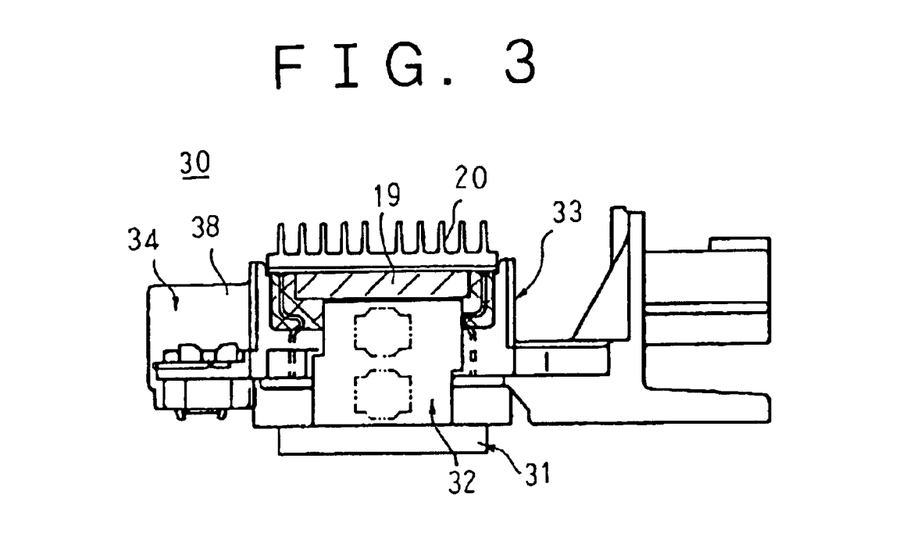
FIG. 3 is a side elevation showing the capacitor assembly for an alternator according to Embodiment 1 of the present invention.
Figure 4:
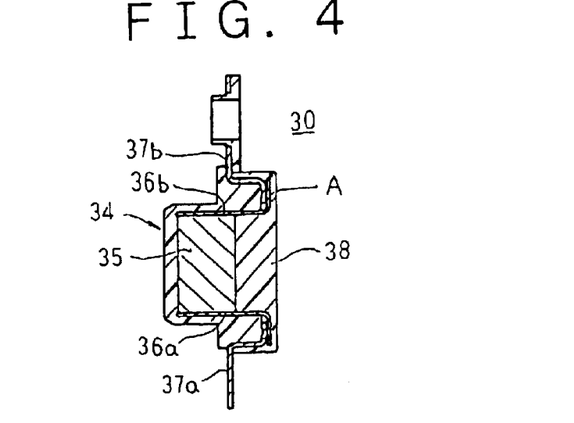
FIG. 4 is a cross section taken along line IV—IV in FIG. 2 viewed from the direction of the arrows.
Figure 5:
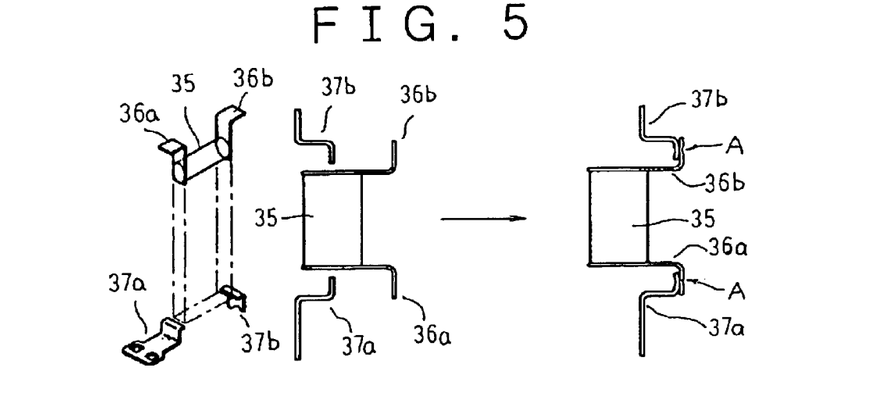
FIG. 5 is a process diagram explaining a method for manufacturing the capacitor assembly for an alternator according to Embodiment 1 of the present invention.

FIG. 1 is a longitudinal section showing an alternator mounted with a capacitor assembly according to Embodiment 1 of the present invention, FIG. 2 is a front elevation showing the capacitor assembly for an alternator according to Embodiment 1 of the present invention viewed from a front end, FIG. 3 is a side elevation showing the capacitor assembly for an alternator according to Embodiment 1 of the present invention, FIG. 4 is a cross section taken along line IV—IV in FIG. 2 viewed from the direction of the arrows, and FIG. 5 is a process diagram explaining a method for manufacturing the capacitor assembly for an alternator according to Embodiment 1 of the present invention.

In FIG. 1, an alternator case 3 is constructed by assembling a front bracket 1 and a rear bracket 2 made of aluminum with rims facing and fastening the front bracket 1 and a rear bracket 2 together by means of a through bolt 4. A stator 5 constituted by a cylindrical stator core 6 and a stator winding 7 installed in the stator core 6 is disposed in an interior space of the alternator case 3 so as to be clamped between a side wall of the front bracket 1 and a side wall of the rear bracket 2.

A shaft 8 is rotatably mounted to a central portion of the front bracket 1 and a central portion of the rear bracket 2 by means of a front bearing 9f and a rear bearing 9r. A pulley 10 is securely fastened by a nut 11 to an end portion of the shaft 8 extending outward from the front bracket 1. A Lundell-type rotor 12 constituted by a pole core 13 and a field winding 14 installed in the pole core 13 is fixed to the shaft 8 and rotatably disposed inside the stator 5. In addition, a pair of slip rings 16 for supplying electric current to the rotor 12 are fixed to the rear end of the shaft 8 so as to be separated from each other in an axial direction.

A pair of brushes 17 are housed in a brush holder 30 disposed in the interior space of the alternator case 3 at the rear end of the rotor 12, each brush 17 being placed in contact with one of the slip rings 16 by the force of a spring 18. A voltage regulator 19 for adjusting the magnitude of an alternating voltage generated in the stator 5 is fixed to a regulator cooling plate 20 and mounted to the brush holder 30. In addition, a rear plate 21 made of a resin is disposed so as to fill an air gap between the brush holder 30 and the rear bracket 2.

A rectifier assembly 22 is electrically connected to the stator 5 and converts the alternating current generated in the stator 5 into direct current, the rectifier assembly 22 being constructed by fixing a plurality of unidirectional conducting components 23 to a rectifier cooling plate 24. This rectifier assembly 22 is mounted to the rear bracket 2 by inserting a B terminal 25 thereof through a penetrating aperture 2c disposed through the rear bracket 2, and fastening a B-terminal molding 26 by a nut 28 to an end portion of the B terminal 25 extending outward from the rear bracket 2. Moreover, a relay terminal 27 is insert molded into this B-terminal molding 26.

A front fan 15f and a rear fan 15r are fixed to a front-end end surface and a rear-end end surface, respectively, of the pole core 13.

The brush holder 30 will now be explained with reference to FIGS. 2 to 5.

The brush holder 30 is a resin-molded part mounted to the alternator case 3 and, as shown in FIGS. 2 and 3, is provided with: a cylindrical slinger portion 31; a brush holder portion 32 disposed so as to extend radially outward from the slinger portion 31; a voltage regulator mount portion 33 formed behind (at the rear end of) the brush holder portion 32; and a capacitor portion 34 formed to one side of the slinger portion 31. This brush holder 30 is prepared by inserting various insert conductors inside a metal mold and injecting a polyphenylene sulfide (PPS) resin functioning as a first molding resin into the metal mold.

Here, as shown in FIG. 5, the capacitor component 35 is disposed inside the metal mold with other insert conductors such that a capacitor positive electrode terminal 36a thereof is joined by crimping to a positive terminal 37a, which is one of the insert conductors, and a capacitor negative electrode terminal 36b is joined by crimping to a negative terminal 37b, which is also one of the insert conductors. Moreover, the As in FIG. 5 indicate the crimped portions.

Thus, as shown in FIG. 4, the capacitor component 35 is embedded in a first resin portion 38 composed of the PPS resin, end portions of the positive and negative terminals 37a and 37b being exposed or extending outward from the first resin portion 38 so that electrical connection can be made.

The regulator cooling plate 20 is fitted into and secured to the voltage regulator mount portion 33 such that the voltage regulator 19 is housed inside the voltage regulator mount portion 33, and the brushes 17 and the springs 18 are mounted into the brush holder portion 32. Here, tips of the brushes 17 extend into the slinger portion 31 due to the force of the springs 18.

The brush holder 30 is securely fastened to an inner wall surface of the rear bracket 2 so as to be perpendicular to a central axis of the shaft 8. The shaft 8 is inserted into the slinger portion 31 while pushing the brushes 17 inside the brush holder portion 32. Hence, the brushes 17 are placed in contact with the slip rings 16 by the force of the springs 18, ensuring electrical connection. The negative terminal 37b is electrically connected to the rear bracket 2 by a fastening screw (not shown). Similarly, the positive terminal 37a is electrically connected to the B terminal 25, which is the positive terminal of the rectifier assembly 22.

Next, the operation of the alternator constructed in this manner when mounted to an automobile will be explained.

The alternator is mounted to the outside of a cylinder block of an engine, a looped belt is placed over the alternator pulley 10 and a pulley disposed on the crank shaft of the engine, and the relay terminal 27 is connected to a vehicle connection terminal (not shown).

When an ignition switch is switched on, the engine starts and an excitation current simultaneously flows from a battery in the automobile, through the voltage regulator 19, through the brushes 17 and the slip rings 16 to the field winding 14. Torque from the engine is transmitted to the shaft 8 by means of the belt, rotating the shaft 8, and consequently rotating the rotor 2. Hence, a rotating magnetic field is applied to the stator 5, generating a three-phase alternating-current induced electromotive force in the stator winding 7. This induced electromotive force is rectified by the rectifier assembly 22 and the magnitude of the output voltage therefrom is adjusted by the voltage regulator 19. Output from the rectifier assembly 22 passes through the B terminal 25, the relay terminal 27, and the vehicle connection terminal to charge the battery.

The capacitor component 35 is connected in parallel between the positive electrode and the negative electrode of the alternator to absorb surges generated by the voltage regulator 19 and to prevent the propagation of noise to the vehicle electrical load devices.

The front fan 15f and the rear fan 15r rotate due to rotation of the rotor 12, and air from inside the engine compartment is taken in through front-end air intake apertures 1a in the front bracket 1 and rear-end air intake apertures 2a in the rear bracket 2 as front-end and rear-end cooling airflows in an interior space of the alternator case 3.

The front-end cooling airflow which was taken in through the front-end air intake apertures 1a in the front bracket 1 is deflected centrifugally by the front fan 1, cools coil ends of the stator winding 7, and is then expelled inside the engine compartment through front-end air discharge apertures 1b.

On the other hand, the rear-end cooling airflow which was taken in through the rear-end air intake apertures 2a in the rear bracket 2 flows radially inward along fins on the cooling plates 20 and 24 of the voltage regulator 19 and the rectifier assembly 22, cooling the voltage regulator 19 and the rectifier assembly 22. The rear-end cooling airflow is prevented from flowing in an axial direction by the brush holder 30, the rear plate 21, and the rectifier assembly 22, and instead flows radially inward. The rear-end cooling airflow passes through gaps between the brush holder 30 and the shaft 8 and between the rectifier assembly 22 and the shaft 8, and flows toward the rotor 12, cooling sliding portions between the slip rings 16 and the brushes 17. The rear-end cooling airflow arriving at the rotor 12 is deflected centrifugally by the rear fan 15r, cools coil ends of the stator winding 7, and is then expelled inside the engine compartment through rear-end air discharge apertures 2b.

According to Embodiment 1, because the capacitor component 35 is embedded in the first resin portion 38 of the brush holder 30, which is composed of a single molding resin, cracks are less likely to form in the first resin portion 38 of the brush holder 30 by ambient temperature increases or heat received from other heat-generating parts, thereby preventing the occurrence of insulation failure resulting from penetration by water, etc.

Because the crimped portion A between the capacitor positive electrode terminal 36a and the positive terminal 37a and the crimped portion A between the capacitor negative electrode terminal 36b and the negative terminal 37b are embedded in the first resin portion 38, the crimped portions A are prevented from being exposed to salt water, corroding, and giving rise to contact failure, and dislodging of the crimped portions A by vibrations from the engine is also prevented. In addition, external forces do not act directly on the crimped portions A, thereby also preventing dislodging of the crimped portions A by external forces.

Because the capacitor positive electrode terminal 36a and the positive terminal 37a are joined by crimping and the capacitor negative electrode terminal 36b and the negative terminal 37b are joined by crimping, in other words, because the crimped portions A are connected mechanically, the bond strength of the crimped portions A is ensured even in a high-temperature molding process using the PPS resin, thereby achieving high yield and improving the reliability of the electrical connections.

According to Embodiment 1, because the capacitor assembly is manufactured by molding the capacitor component 35 integrally during molding of the brush holder 30, the need for processes for injecting and hardening a filler resin to secure the capacitor component 35 is eliminated, providing a method for manufacturing a capacitor assembly enabling manufacturing time to be shortened.

Because the capacitor positive electrode terminal 36a and the positive terminal 37a, and the capacitor negative electrode terminal 36b and the negative terminal 37b are connected by crimping (a terminal joining process) before the molding process, the capacitor component 35, the capacitor positive electrode terminal 36a, the capacitor negative electrode terminal 36b, the positive terminal 37a, and the negative terminal 37b are integrated, facilitating setting thereof in the metal mold, thereby enabling the workability of the molding process to be improved.

Embodiment 2

Figure 6:
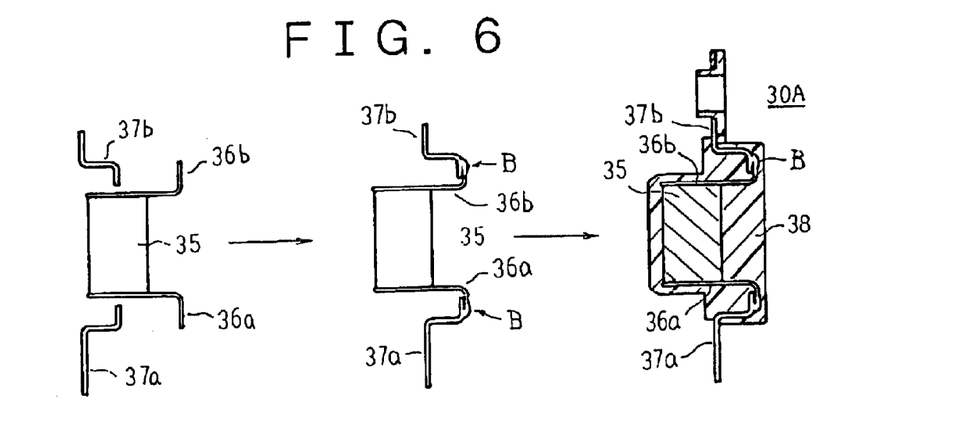
FIG. 6 is a process diagram explaining a method for manufacturing a capacitor assembly for an alternator according to Embodiment 2 of the present invention.

In Embodiment 2, as shown in FIG. 6, a brush holder 30A is prepared as a resin-molded part by tungsten-inert gas (TIG) welding the capacitor positive electrode terminal 36a of the capacitor component 35 to the positive terminal 37a, TIG welding the capacitor negative electrode terminal 36b of the capacitor component 35 to the negative terminal 37b, disposing the capacitor component 35 inside the metal mold with other insert conductors, and injecting the PPS resin inside the metal mold. Moreover, the Bs in FIG. 6 indicate the weld portions.

Moreover, the rest of this embodiment is constructed in a similar manner to Embodiment 1 above.

Consequently, similar effects to those in Embodiment 1 above can also be achieved in Embodiment 2.

According to Embodiment 2, because the capacitor positive electrode terminal 36a and the positive terminal 37a are TIG welded and the capacitor negative electrode terminal 36b and the negative terminal 37b are TIG welded, in other words, because the terminals are integrated by welding at the weld portions B, greater bond strength is achieved than by joining by crimping. Thus, dislodging of the weld portions B by vibrations from the engine is reliably prevented, improving the reliability of the electrical connections. Similarly, dislodging of the weld portions B during the high-temperature molding process using the PPS resin is reliably prevented, thereby achieving high yield and improving the reliability of the electrical connections.

Embodiment 3

In Embodiment 1 above, the capacitor assembly is constructed by adapting the brush holder into a resin-molded part, but in Embodiment 3, a capacitor assembly is constructed by adapting a rear plate into a resin-molded part.

Figure 7:
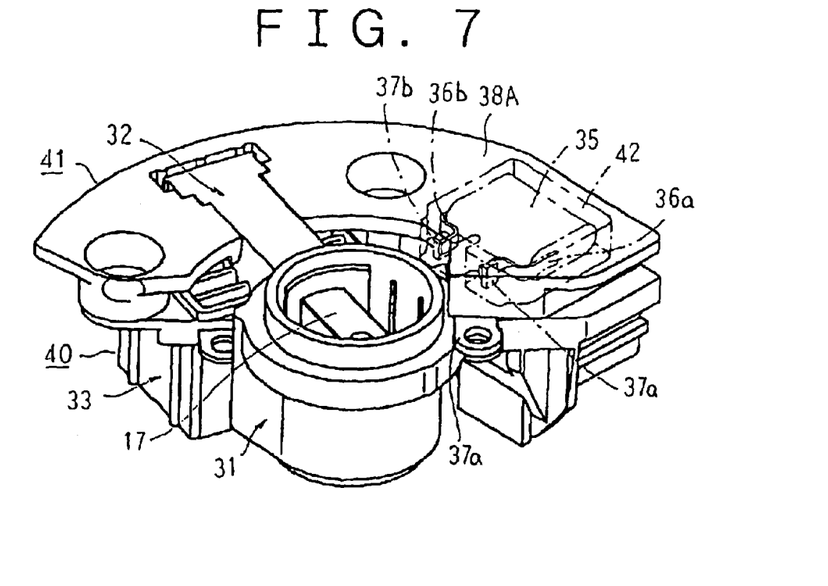
FIG. 7 is a perspective showing a capacitor assembly for an alternator according to Embodiment 3 of the present invention mounted to a brush holder.
Figure 8:
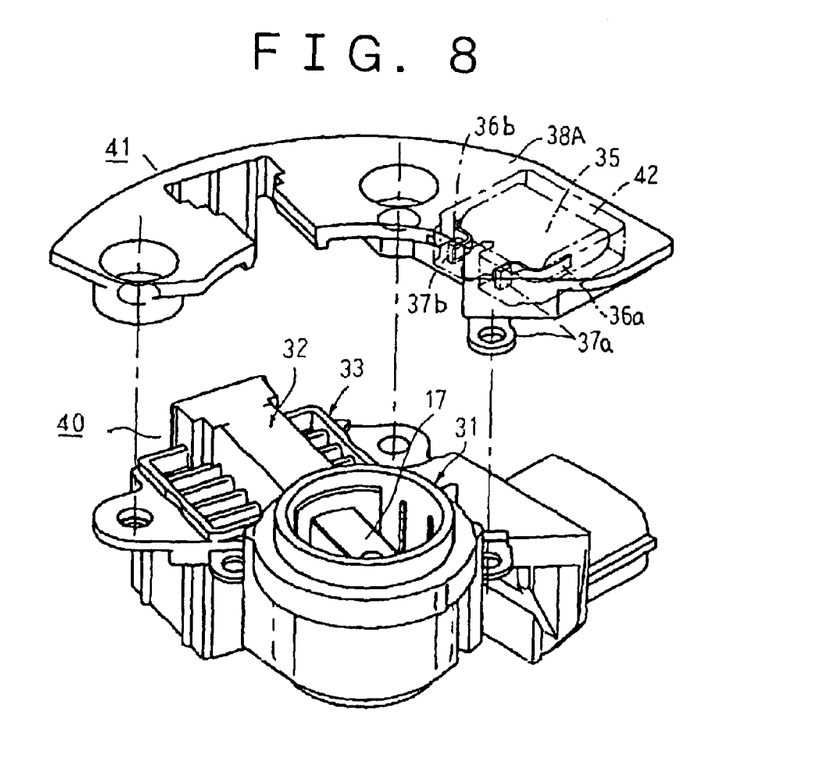
FIG. 8 is an exploded perspective of FIG. 7.

FIG. 7 is a perspective showing a capacitor assembly for an alternator according to Embodiment 3 of the present invention mounted to a brush holder, and FIG. 8 is an exploded perspective of FIG. 7.

In FIGS. 7 and 8, a brush holder 40 is constructed in a similar manner to the brush holder 30 in Embodiment 1 except for the fact that the capacitor component 35, the capacitor positive and negative electrode terminals 36a and 36b, and the positive and negative terminals 37a and 37b are not molded therein.

A rear plate 41 is a resin-molded part mounted to the alternator case 3 with the brush holder 40 and is formed into a generally arc-shaped flat plate molded using a PPS resin functioning as a first electrically-insulating resin, being mounted to the front end of the brush holder 40 to block the passage of the rear-end cooling airflow from flowing past the brush holder 40. In other words, this rear plate 41 serves a function of blocking a path of the rear-end cooling airflow by which the rear-end cooling airflow taken in through the rear-end air intake apertures 2a flows axially and reaches the rotor 12 directly. Hence, the rear-end cooling airflow taken in through the rear-end air intake apertures 2a flows axially until it reaches the rear plate 41, then flows radially inward along the rear plate 41, passes between the brush holder 40 and the shaft 8, and flows toward the rotor 12, effectively cooling the sliding portions between the brushes 17 and the slip rings 16.

The capacitor component 35 is premolded into a second resin portion 42 using a polycarbonate (PC) resin functioning as a second molding resin with the capacitor positive electrode terminal 36a and the capacitor negative electrode terminal 36b mounted thereto. Moreover, tip portions of the capacitor positive electrode terminal 36a and the capacitor negative electrode terminal 36b extend outward from the second resin portion 42 composed of the PC resin. The rear plate 41 functioning as the capacitor assembly is prepared by disposing the premolded capacitor component 35 inside the metal mold with the capacitor positive electrode terminal 36a TIG welded to the positive terminal 37a and the capacitor negative electrode terminal 36b TIG welded to the negative terminal 37b, and injecting a PPS resin functioning as a first molding resin into the metal mold to form a first resin portion 38A.

Moreover, the rest of this embodiment is constructed in a similar manner to Embodiment 1 above.

Thus, similar effects to those in Embodiment 1 above can also be achieved in Embodiment 3.

According to Embodiment 3, because the capacitor component 35 is premolded before the molding process of the first resin portion 38A, heat in the molding process acts on the capacitor component 35 through the second resin portion 42, suppressing heat degradation of the capacitor component 35.

Because the second resin portion 42 composed of the PC resin is embedded in the first resin portion 38A composed of the PPS resin, even if cracks form at the interface between the first resin portion 38A and the second resin portion 42, due to ambient temperature increases or heat received from other heat-generating parts, cracks are unlikely to form in both the first resin portion 38A and the second resin portion 42, thereby preventing the occurrence of insulation failure resulting from penetration by water, etc.

Because the melting point of the PC resin functioning as the second molding resin is higher than the temperature of molding using the PPS resin functioning as the first molding resin, the second resin portion 42 is not melted by the molding process of the first resin portion 38A, reducing the effects of heat from the molding process on the capacitor component 35.

Embodiment 4

In Embodiment 3 above, a PPS resin is used for the first molding resin and a PC resin is used for the second molding resin, but in Embodiment 4, a PPS resin is used for both the first and second molding resins.

Moreover, the rest of this embodiment is constructed in a similar manner to Embodiment 3 above.

Figure 9:
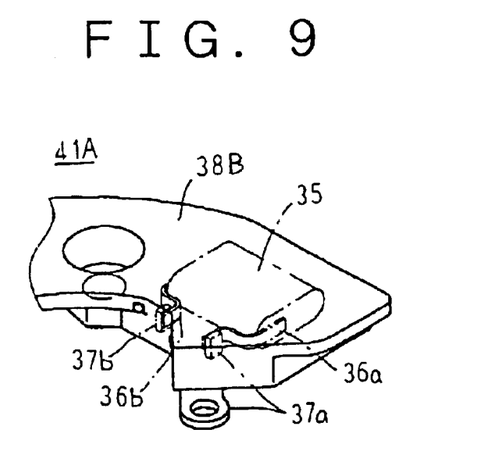
FIG. 9 is a perspective showing part of a capacitor assembly for an alternator according to Embodiment 4 of the present invention.

In a rear plate 41A according to Embodiment 4, because a PPS resin is used for both the first and second molding resins, a peripheral portion of the second resin portion 42 premolded with the capacitor component 35 melts during a molding process of a first resin portion 38B. Thus, the interface between the first and second resin portions 38B and 42 is integrated by melting, and the interface between the first and second resin portions 38B and 42 disappears as shown in FIG. 9, making the construction equivalent to the capacitor component 35 being molded only in the first resin portion 38B.

Consequently, according to Embodiment 4, because the capacitor component 35 is premolded in the second resin portion 42 before the molding process for the first resin portion 38B, the effects of heat from the molding process on the capacitor component 35 are suppressed.

Because the first and second resin portions 38B and 42 are integrated by melting, cracks are less likely to form at the interface between the first resin portion 38B and the second resin portion 42 due to ambient temperature increases or heat received from other heat-generating parts.

In addition, because the first and second resin portions 38B and 42 are both prepared using the PPS resin, the difference between the coefficients of thermal expansion and thermal contraction of the first and second resin portions 38B and 42 is eliminated, making cracks less likely to form at the interface between the first resin portion 38B and the second resin portion 42.

Embodiment 5

In Embodiment 3 above, the capacitor component 35 is premolded using the PC resin before the molding process for the first resin portion 38B using the PPS resin, but in Embodiment 5, a bag-shaped cover 43 prepared using a polyethylene terephthalate (PET) resin is mounted over the capacitor component 35 before a molding process for a first resin portion 38C using a PET resin.

Moreover, the rest of this embodiment is constructed in a similar manner to Embodiment 3 above.

Figure 10:
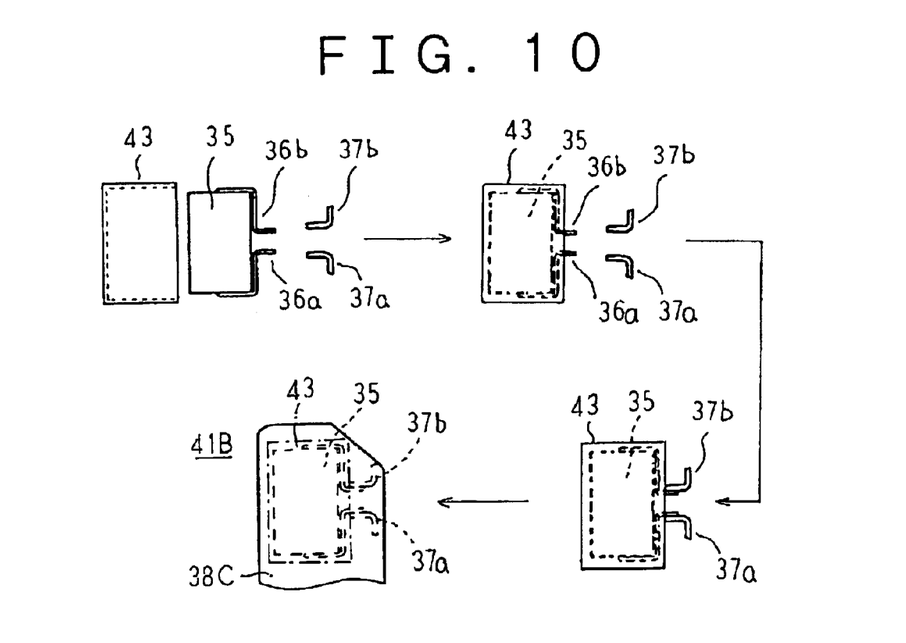
FIG. 10 is a process diagram explaining a method for manufacturing a capacitor assembly for an alternator according to Embodiment 5 of the present invention.

In Embodiment 5, as shown in FIG. 10, the capacitor component 35 is first housed in the bag-shaped cover 43 prepared using the PET resin, which functions as a second molding resin. Here, the tips of the capacitor positive electrode terminal 36a and the capacitor negative electrode terminal 36b extend outward from the cover 43. Next, the capacitor positive electrode terminal 36a and the capacitor negative electrode terminal 36b of the capacitor component 35 are TIG welded to the positive terminal 37a and the negative terminal 37b, respectively. Then, a rear plate 41B functioning as a capacitor assembly is prepared by disposing the capacitor component 35 mounted with the cover 43 inside a metal mold and injecting the PET resin, which functions as a first molding resin, inside the metal mold to form the first resin portion 38C.

Consequently, according to Embodiment 5, because the cover 43 is mounted to the capacitor component 35 before the molding process for the first resin portion 38C, the effects of heat from the molding process on the capacitor component 35 are suppressed.

Because the first molding resin molded with the cover 43 is composed of the same resin (a PET resin) as the cover 43, a peripheral portion of the cover 43 melts in the molding process for the first resin portion 38C, integrating the first resin portion 38C and the cover 43 by melting. Thus, cracks are less likely to form at the interface between the first resin portion 38C and the cover 43 due to ambient temperature increases or heat received from other heat-generating parts.

In addition, because the first resin portion 38C and the cover 43 are both prepared using the PET resin, the difference between the coefficients of thermal expansion and thermal contraction of the first resin portion 38C and the cover 43 is eliminated, making cracks less likely to form at the interface between the first resin portion 38C and the cover 43.

Moreover, in Embodiment 5 above, the first resin portion 38C and the cover 43 are composed of the same resin, but the first resin portion 38C and the cover 43 may also be composed of different resins. In that case, it is desirable that a material having a melting point which is higher than the molding temperature of the first resin portion 38C be chosen for the resin composing the cover 43.

Embodiment 6

Figure 11:
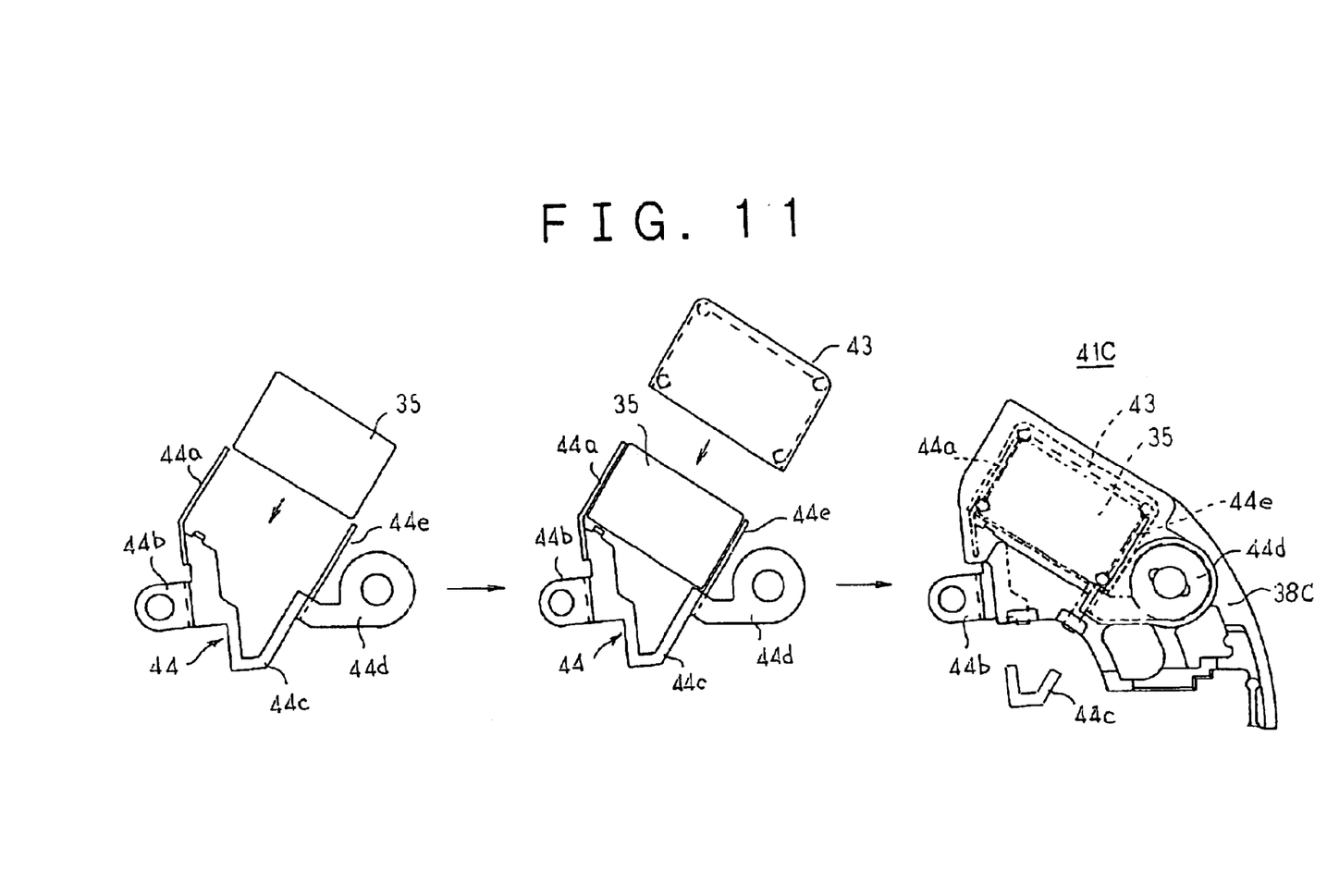
FIG. 11 is a process diagram explaining a method for manufacturing a capacitor assembly for an alternator according to Embodiment 6 of the present invention.

FIG. 11 is a process diagram explaining a method for manufacturing a capacitor assembly for an alternator according to Embodiment 6 of the present invention.

A method for manufacturing a capacitor assembly according to Embodiment 6 will be explained with reference to FIG. 11.

First, a terminal member 44 in which a capacitor positive electrode terminal 44a, a positive terminal 44b, a linking portion 44c, a negative terminal 44d, and a capacitor negative electrode terminal 44e are linked in order is prepared by sheet metal working a single metal sheet. Positive and negative electrode portions of the capacitor component 35 are joined to the capacitor positive electrode terminal 44a and the capacitor negative electrode terminal 44e, respectively. In addition, a cover 43 composed of a PET resin functioning as a second molding resin is mounted so as to envelop the capacitor component 35. A resin-molded body is prepared by disposing the capacitor component 35 mounted with the cover 43 inside a metal mold and injecting a PET resin functioning as a first molding resin inside the metal mold to form a first resin portion 38C. This resin-molded body is formed such that portions of the positive terminal 44b, the linking portion 44c, and the negative terminal 44d are exposed or extend outward from the first resin portion 38C composed of the PET resin. Next, a rear plate 41C (a resin-molded part) functioning as a capacitor assembly is prepared by cutting and removing the linking portion 44c extending outward from the first resin portion 38C of the resin-molded body extracted from the metal mold.

Because the capacitor component 35 mounted with the cover 43 composed of the PET resin functioning as the second molding resin is molded using the PET resin functioning as the first molding resin, effects similar to Embodiment 5 above can also be achieved in Embodiment 6.

In Embodiment 6, because the capacitor positive electrode terminal 44a and the positive terminal 44b are prepared using the single metal sheet and the negative terminal 44d and the capacitor negative electrode terminal 44e are prepared using the single metal sheet, problems due to dislodging of the joint portions are solved completely.

Because the terminal member 44 in which the capacitor positive electrode terminal 44a, the positive terminal 44b, the linking portion 44c, the negative terminal 44d, and the capacitor negative electrode terminal 44e are linked in order is prepared by sheet metal working the single metal sheet, the capacitor component 35 is joined to the capacitor positive electrode terminal 44a and the capacitor negative electrode terminal 44b of the terminal member 44, then molded using the first molding resin, and the linking portion 44c extending outward from the first resin portion 38C is cut and removed, the operation of joining a capacitor positive electrode terminal and a positive terminal and the operation of joining a capacitor negative electrode terminal and a negative terminal are no longer necessary, enabling shortening of the manufacturing process.

Embodiment 7

In Embodiment 1 above, the capacitor assembly is constructed by adapting the brush holder into a resin-molded part, but in Embodiment 7, a capacitor assembly is constructed by adapting a circuit board of a rectifier assembly into a resin-molded part.

Figure 12:
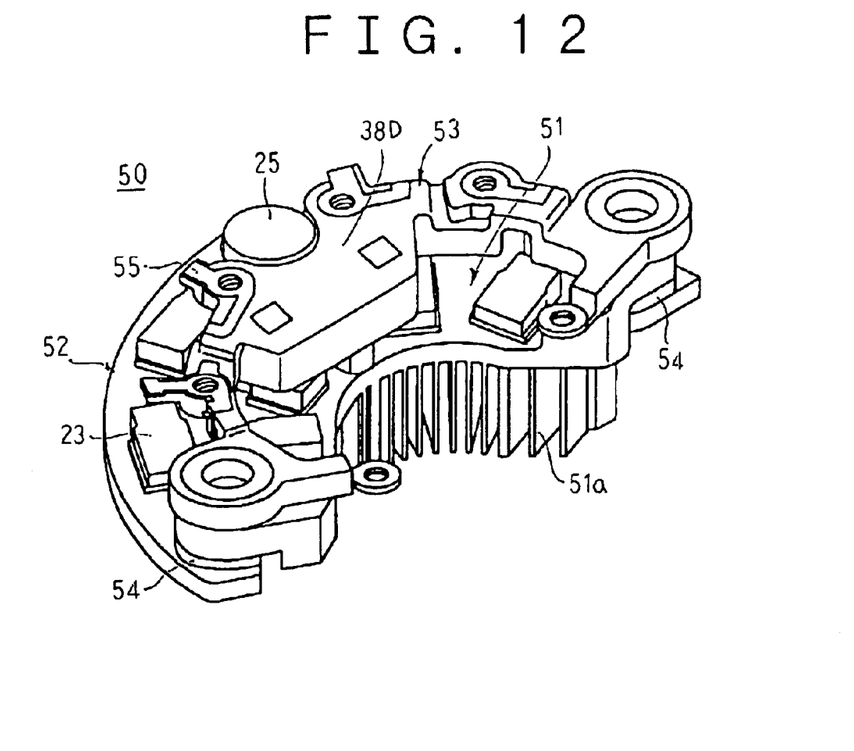
FIG. 12 is a perspective showing a rectifier assembly for an alternator according to Embodiment 7 of the present invention.
Figure 13:
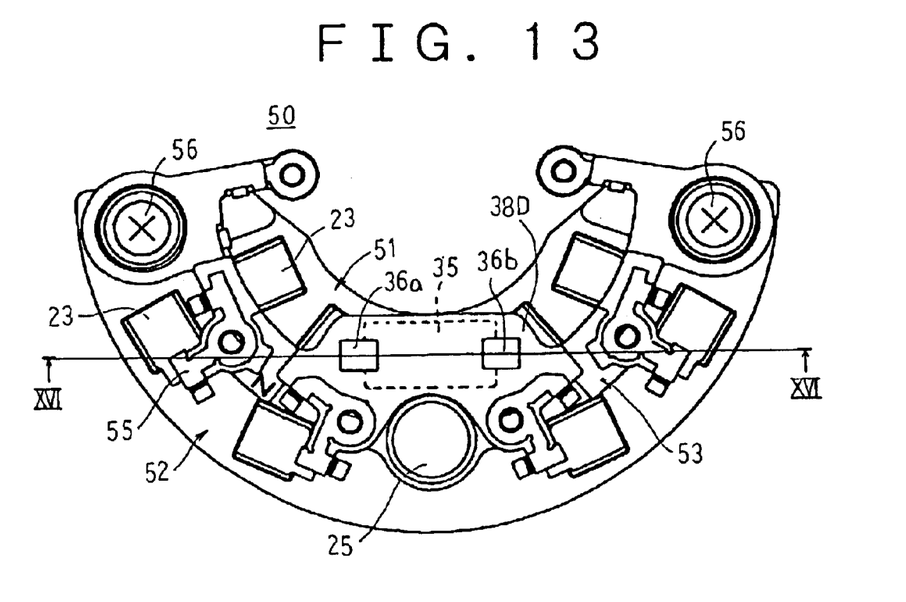
FIG. 13 is a front elevation showing the rectifier assembly for an alternator according to Embodiment 7 of the present invention.
Figure 14:
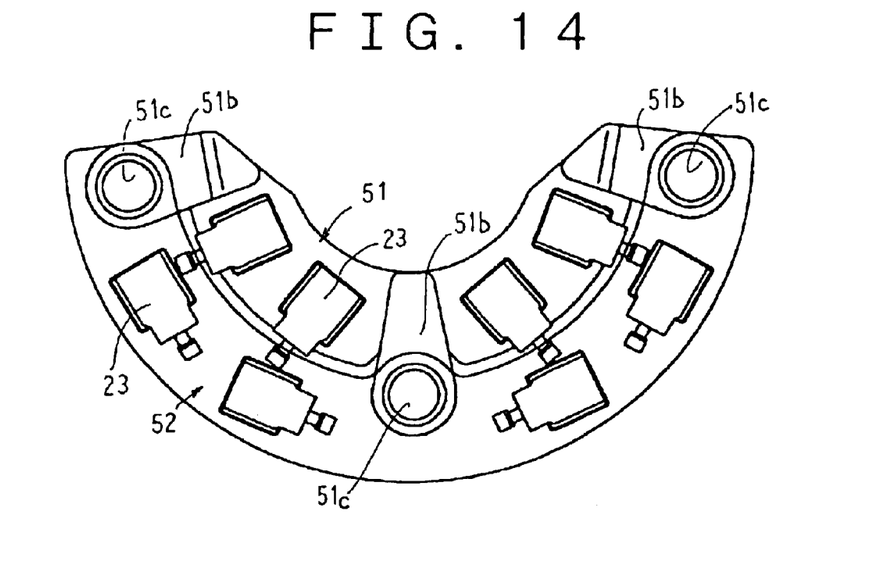
FIG. 14 is a front elevation showing an assembled state of first and second cooling plates in the rectifier assembly for an alternator according to Embodiment 7 of the present invention.
Figure 15:
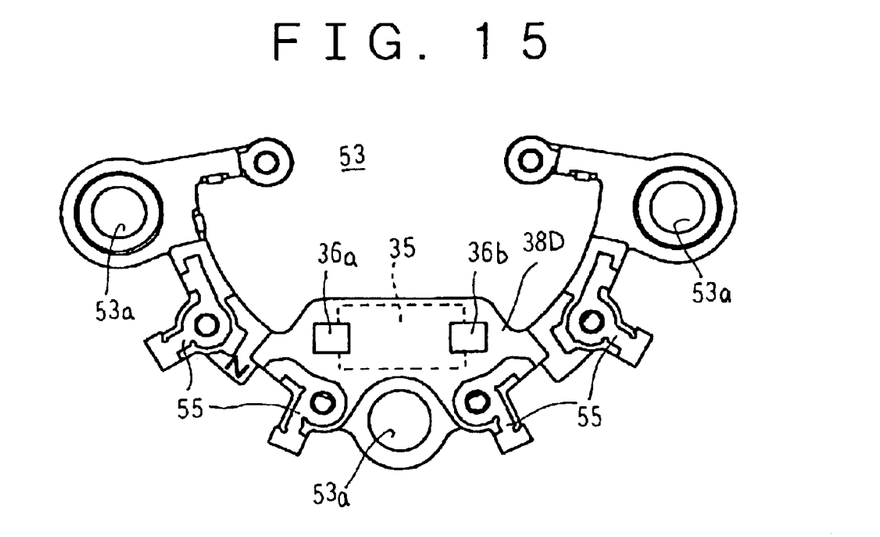
FIG. 15 is a front elevation showing a circuit board in the rectifier assembly for an alternator according to Embodiment 7 of the present invention.
Figure 16:
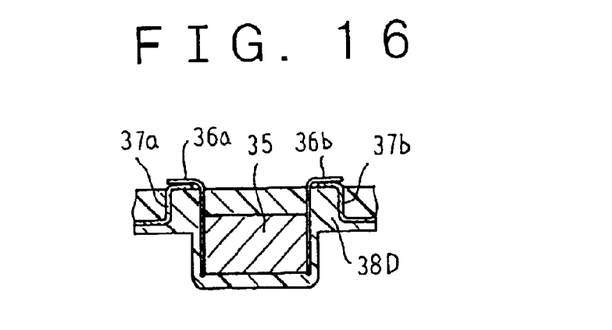
FIG. 16 is a cross section taken along line XVI—XVI in FIG. 13 viewed from the direction of the arrows.

FIG. 12 is a perspective showing a rectifier assembly for an alternator according to Embodiment 7 of the present invention, FIG. 13 is a front elevation showing the rectifier assembly for an alternator according to Embodiment 7 of the present invention, FIG. 14 is a front elevation showing an assembled state of first and second cooling plates in the rectifier assembly for an alternator according to Embodiment 7 of the present invention, FIG. 15 is a front elevation showing a circuit board in the rectifier assembly for an alternator according to Embodiment 7 of the present invention, and FIG. 16 is a cross section taken along line XVI—XVI in FIG. 13 viewed from the direction of the arrows.

In each of the figures, a rectifier assembly 50 is constituted by: first and second rectifier cooling plates 51 and 52 made of aluminum having unidirectional conducting components 23 disposed thereon; and a horseshoe-shaped circuit board 53 functioning as a resin-molded part.

The first rectifier cooling plate 51 is formed into a horseshoe shape, four unidirectional conducting components 23 being mounted on a major surface thereof so as to line up in a circumferential direction, heat-dissipating fins 51a being disposed so as to stand on a rear surface thereof (a surface on the opposite side from the major surface). Mount portions 51b are disposed so as to extend radially outward from first and second end portions and a central portion of the first rectifier cooling plate 51. In addition, a mounting aperture 51c is disposed through each of the mount portions 51b.

The second rectifier cooling plate 52 is formed into a horseshoe shape having a larger diameter than that of the first rectifier cooling plate 51, four unidirectional conducting components 23 being mounted on a major surface thereof so as to line up in a circumferential direction. Mounting apertures (not shown) are disposed through first and second end portions and a central portion of the second rectifier cooling plate 52.

The circuit board 53 is insert molded with the capacitor component 35 and insert conductors composed of circuit board connection terminals 55, the positive terminal 37a, and the negative terminal 37b using a PET resin functioning as a first molding resin. Here, the capacitor component 35 is embedded in a first resin portion 38D such that tips of the capacitor positive electrode terminal 36a and the capacitor negative electrode terminal 36b extend outward. End portions of the positive terminal 37a and the negative terminal 37b also extend outward from the first resin portion 38D. After being insert molded, the capacitor positive electrode terminal 36a and the capacitor negative electrode terminal 36b are soldered to the positive terminal 37a and the negative terminal 37b, respectively.

Moreover, the circuit board connection terminals 55 electrically connect the connection terminals 23a of the unidirectional conducting components 23 mounted on the first rectifier cooling plate 51 and the connection terminals 23a of the unidirectional conducting components 23 mounted on the second rectifier cooling plate 52. Mounting apertures 53a are disposed through first and second end portions and a central portion of the circuit board 53.

The first and second rectifier cooling plates 51 and 52 are disposed coaxially with planes of the major surfaces thereof aligned, and are electrically insulated from each other by interposing electrically-insulating bushes 54 between the mount portions 51b and the major surface of the second rectifier cooling plate 52. In addition, the circuit board 53 is disposed on the major surfaces of the first and second rectifier cooling plates 51 and 52. Here, each of the mounting apertures 51c and 53a disposed through the first rectifier cooling plate 51, the second rectifier cooling plate 52, and the circuit board 53 align. The B terminal 25, which is an output terminal, is press-fitted into the mounting apertures 51c and 53a in the central portion. Hence, the first rectifier cooling plate 51, the second rectifier cooling plate 52, and the circuit board 53 are integrated.

The rectifier assembly 50 assembled in this manner is mounted to the rear bracket 2 by inserting the B terminal 25 through the penetrating aperture 2c disposed through the rear bracket 2, passing mounting bolts 56 through the mounting apertures 51c and 53a at the first and second end portions and fastening the mounting bolts 56 to the rear bracket 2, and further fastening the B-terminal molding 26 to the end portion of the B terminal 25 extending outward from the rear bracket 2 by means of the nut 28.

According to Embodiment 7, because the capacitor component 35 is embedded in the first resin portion 38D of the circuit board 53, which is composed of a single molding resin, cracks are less likely to form in the first resin portion 38D of the circuit board 53 by ambient temperature increases or heat received from other heat-generating parts, thereby preventing the occurrence of insulation failure resulting from penetration by water, etc.

Because the capacitor assembly is prepared by molding the capacitor component 35 integrally during molding of the circuit board 53, the need for processes for injecting and hardening a filler resin to secure the capacitor component 35 is eliminated, providing a method for manufacturing the capacitor assembly enabling manufacturing time to be shortened.

Because the capacitor positive electrode terminal 36a, the capacitor negative electrode terminal 36b, the positive terminal 37a, and the negative terminal 37b are molded in the molding process so as to extend outward the end portions of the terminals 36a, 36b, 37a and 37b from the first resin portion 38D, and then the capacitor positive electrode terminal 36a and the capacitor negative electrode terminal 36b are joined to the positive terminal 37a and the negative terminal 37b, the joint portions between the capacitor positive electrode terminal 36a and the positive terminal 37a and between the capacitor negative electrode terminal 36b and the negative terminal 37b are not affected by the temperature of the molding process, enabling solder, which has a low melting temperature, to be used for those joint portions.

Embodiment 8

Figure 17:
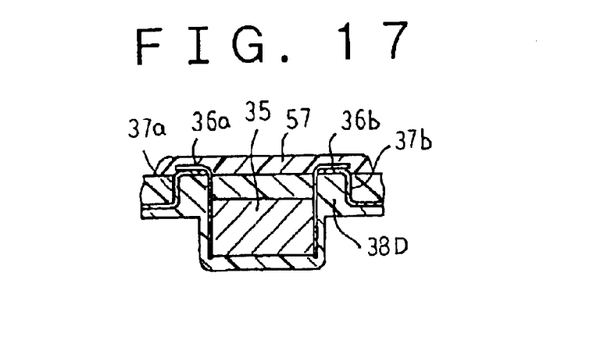
FIG. 17 is a cross section showing part of a capacitor assembly for an alternator according to Embodiment 8 of the present invention.

In Embodiment 8, as shown in FIG. 17, after the process of joining the capacitor positive electrode terminal 36a and the positive terminal 37a and joining the capacitor negative electrode terminal 36b and the negative terminal 37b, the joint portions are embedded using an elastic resin 57 such as a silicone resin, etc.

Moreover, the rest of this embodiment is constructed in a similar manner to Embodiment 7 above.

In Embodiment 8, because the joint portions between the capacitor positive electrode terminal 36a and the positive terminal 37a and between the capacitor negative electrode terminal 36b and the negative terminal 37b are embedded in the elastic resin 57, those joint portions are not exposed to foreign matter such as salt water, suppressing the occurrence of insulation failure resulting from corrosion of the joint portions. Even if stress is arises at the interface between the first resin portion 38D and the elastic resin 57 as a result of differences between the coefficients of thermal expansion and thermal contraction of the first resin portion 38D and the elastic resin 57 due to ambient temperature increases or heat received from other heat-generating parts, that stress is absorbed by the elasticity of the resin 57, suppressing the formation of cracks at the interface between the first resin portion 38D and the elastic resin 57.

Embodiment 9

In Embodiment 1 above, the capacitor assembly is constructed by adapting the brush holder into a resin-molded part, but in Embodiment 9, a capacitor assembly is constructed by adapting the B-terminal molding into a resin-molded part.

Figure 18:
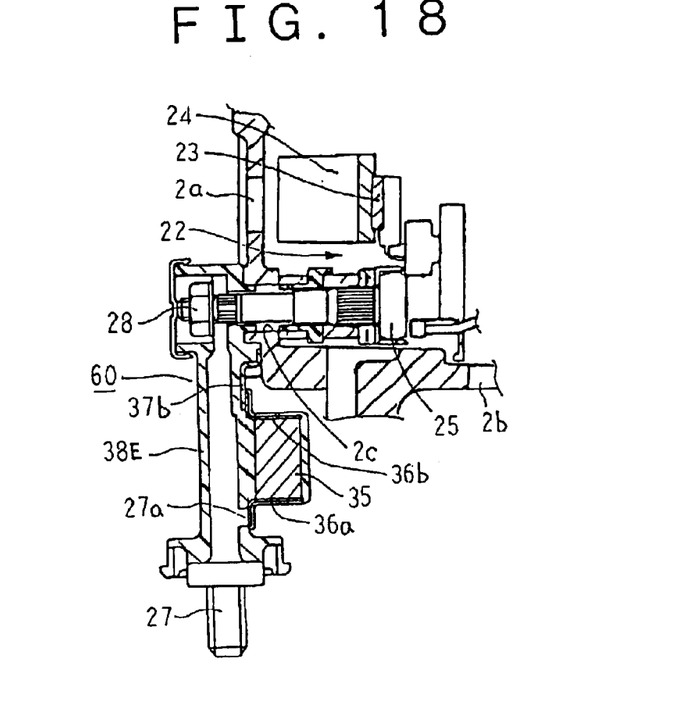
FIG. 18 is a partial cross section showing a mounted state of a capacitor assembly for an alternator according to Embodiment 9 of the present invention.

FIG. 18 is a partial cross section showing a capacitor assembly for an alternator according to Embodiment 9 of the present invention.

In FIG. 18, a B-terminal molding 60 functioning as a capacitor assembly is insert molded with the relay terminal 27, the capacitor component 35 having the capacitor positive electrode terminal 37a and the capacitor negative electrode terminal 37b, and the negative terminal 37b using a PET resin functioning as a first molding resin. The capacitor positive electrode terminal 36a is joined to a protruding portion 27a of the relay terminal 27 functioning as a positive terminal, and the capacitor negative electrode terminal 36b is joined to the negative terminal 37b. The capacitor positive electrode terminal 37a, the capacitor negative electrode terminal 37b, and the capacitor component 35 are embedded in a first resin portion 38E composed of a PET resin. Moreover, a portion of the negative terminal 37b is exposed from the first resin portion 38E, the remaining portion of the negative terminal 37b being embedded in the first resin portion 38E.

The B-terminal molding 60 constructed in this manner is mounted to the rear bracket 2 by fastening the relay terminal 27 to the end portion of the B terminal 25 extending outward from the rear bracket 2 by means of the nut 28, the B terminal constituting the positive electrode of the alternator. The portion of the negative terminal 37b exposed from the first resin portion 38E is placed in contact with an outer wall surface of the rear bracket 2, which constitutes the negative electrode of the alternator. Hence, the capacitor component 35 is connected in parallel between the positive electrode and the negative electrode of the alternator.

A method for manufacturing this B-terminal molding 60 will now be explained.

First, an end portion of the capacitor positive electrode terminal 36a is TIG welded to the protruding portion 27a of the relay terminal 27, and an end portion of the capacitor negative electrode terminal 36b is TIG welded to the negative terminal 37b. Then, the B-terminal molding 60 functioning as the capacitor assembly is prepared by disposing the relay terminal 27, the capacitor component 35, and the negative terminal 37b integrated by TIG welding in this manner inside a metal mold and injecting a PET resin inside the metal mold.

In Embodiment 9, because the capacitor component 35 is embedded in a single resin (the first resin portion 38E), and the capacitor positive electrode terminal 36a and the capacitor negative electrode terminal 36b are TIG welded to the protruding portion 27a of the relay terminal 27 and the negative terminal 37b, respectively, similar effects to those in Embodiment 2 above can also be achieved.

Because the capacitor assembly is manufactured by molding the capacitor component 35 integrally during molding of the B-terminal molding 60, similar effects to those in Embodiment 1 above can also be achieved.

Moreover, in Embodiments 1, 2, and 7 to 9 above, the capacitor component 35 is molded directly into the first molding resin, but the capacitor component 35 may also be premolded into a second molding resin or covered by a cover prepared using the second molding resin before the molding process using the first molding resin.

The present invention is constructed in the above manner and exhibits the effects described below.

As explained above, according to one aspect of the present invention, there is provided a capacitor assembly for an alternator including:

a resin-molded part formed by molding using a first molding resin, the resin-molded part being mounted to an alternator case;

a positive terminal and a negative terminal insert molded into the resin-molded part; and a capacitor component installed between a battery terminal end and ground, the capacitor component having a capacitor positive electrode terminal and a capacitor negative electrode terminal for electrical connection to the positive terminal and the negative terminal, wherein the capacitor component is molded integrally into the resin-molded part so as to be embedded in the resin-molded part, thereby providing a capacitor assembly for an alternator enabling suppression of insulation failure due to penetration by salt water, etc., by preventing separation resulting from ambient temperature increases or heat received from other heat-generating parts, and also enabling manufacturing time to be shortened by omitting processes for filling and hardening a filler resin to secure the capacitor component.

Connection portions between the positive terminal and the capacitor positive electrode terminal and between the negative terminal and the capacitor negative electrode terminal may be embedded in the resin-molded part, eliminating exposure of the connection portions, thereby improving electrical insulation.

The positive terminal and the capacitor positive electrode terminal and the negative terminal and the capacitor negative electrode terminal may be connected by crimping, preventing dislodging of the connection portions resulting from high temperatures during molding.

The positive terminal and the capacitor positive electrode terminal and the negative terminal and the capacitor negative electrode terminal may be connected by welding, reliably preventing dislodging of the connection portions resulting from high temperatures during molding.

The capacitor component may be premolded using a second molding resin such that at least tip portions of the capacitor positive electrode terminal and the capacitor negative electrode terminal are exposed, doubly preventing penetration of foreign matter due to cracks, thereby suppressing corrosion of the capacitor component by foreign matter.

A bag-shaped cover prepared using a second molding resin may be mounted to the capacitor component such that at least tip portions of the capacitor positive electrode terminal and the capacitor negative electrode terminal are exposed, doubly preventing penetration of foreign matter due to cracks, thereby suppressing corrosion of the capacitor component by foreign matter.

The second molding resin may have a melting point higher than the molding temperature of the first molding resin, suppressing the effects of the molding temperature of the first molding resin on the capacitor component.

The first and second molding resins may be identical resins, integrating the boundary between the first and second molding resins by melting, thereby suppressing crack formation between the first and second molding resins resulting from vibrations or heat received.

The positive terminal and the capacitor positive electrode terminal may be prepared using a single metal material, and the negative terminal and the capacitor negative electrode terminal may be prepared using a single metal material, eliminating connection portions between the positive terminal and the capacitor positive electrode terminal and between the negative terminal and the capacitor negative electrode terminal, thereby achieving superior electrical connection reliability.

According to another aspect of the present invention, there is provided a method for manufacturing a capacitor assembly for an alternator including the step of molding a positive terminal, a negative terminal, and a capacitor component using a first molding resin to integrally mold, wherein the capacitor component has a capacitor positive electrode terminal and a capacitor negative electrode terminal for electrical connection to the positive terminal and the negative terminal, and the capacitor component is installed between a battery terminal end and ground, thereby providing a method for manufacturing a capacitor assembly for an alternator enabling suppression of insulation failure due to penetration by salt water, etc., by preventing separation resulting from ambient temperature increases or heat received from other heat-generating parts, and also enabling manufacturing time to be shortened by omitting processes for filling and hardening a filler resin to secure the capacitor component.

A terminal joining process may be provided for connecting the positive terminal and the capacitor positive electrode terminal and connecting the negative terminal and the capacitor negative electrode terminal before the molding process, enabling connection portions between the positive terminal and the capacitor positive electrode terminal and between the negative terminal and the capacitor negative electrode terminal to be embedded in the first molding resin.

A premolding process may be provided for molding the capacitor component using a second molding resin before the terminal joining process such that at least tip portions of the capacitor positive electrode terminal and the capacitor negative electrode terminal are exposed, moderating the effects of heat from the molding process on the capacitor component.

A process may be provided for mounting to the capacitor component a bag-shaped cover composed of a second molding resin before the terminal joining process such that at least tip portions of the capacitor positive electrode terminal and the capacitor negative electrode terminal are exposed, moderating the effects of heat from the molding process on the capacitor component.

Connection portions between the positive terminal and the capacitor positive electrode terminal and between the negative terminal and the capacitor negative electrode terminal may be molded integrally in the molding process so as to be exposed from the first molding resin. A terminal joining process may be provided for connecting the connection portions of the positive terminal and the capacitor positive electrode terminal and connecting the connection portions of the negative terminal and the capacitor negative electrode terminal following the molding process, enabling the use of solder having a low melting point to connect the positive terminal and the capacitor positive electrode terminal and to connect the negative terminal and the capacitor negative electrode terminal.

A process may be provided for embedding the connection portions between the positive terminal and the capacitor positive electrode terminal and between the negative terminal and the capacitor negative electrode terminal using an elastic resin following the terminal joining process, eliminating exposure of the connection portions, thereby improving electrical insulation.

The positive terminal, the capacitor positive electrode terminal, the negative terminal and the capacitor negative electrode terminal may be linked by means of a linking portion to form a terminal member composed of a single metal material, and the terminal member may be molded integrally in the molding step so as to expose a portion of the linking portion from the first molding resin. A process may be provided for cutting the potion of the linking portion exposed from the first molding resin following the molding step, enabling the terminal joining process for connecting the positive terminal and the capacitor positive electrode terminal and connecting the negative terminal and the capacitor negative electrode terminal to be omitted.

What is claimed is:

1. A capacitor assembly for an alternator, comprising:
   a resin-molded part formed by molding using a first molding resin, said resin-molded part being mounted to an alternator case;
   a positive terminal and a negative terminal insert molded into said resin-molded part; and
   a capacitor component installed between a battery terminal end and ground, said capacitor component having a capacitor positive electrode terminal and a capacitor negative electrode terminal for electrical connection to said positive terminal and said negative terminal,
   wherein said capacitor component is molded integrally into said resin-molded part so as to be embedded in said resin-molded part.

2. The capacitor assembly for an alternator according to claim 1 wherein connection portions between said positive terminal and said capacitor positive electrode terminal and between said negative terminal and said capacitor negative electrode terminal are embedded in said resin-molded part.

3. The capacitor assembly for an alternator according to claim 2 wherein said positive terminal and said capacitor positive electrode terminal and said negative terminal and said capacitor negative electrode terminal are connected by crimping.

4. The capacitor assembly for an alternator according to claim 2 wherein said positive terminal and said capacitor positive electrode terminal and said negative terminal and said capacitor negative electrode terminal are connected by welding.

5. The capacitor assembly for an alternator according to claim 1 wherein said capacitor component is premolded using a second molding resin such that at least tip portions of said capacitor positive electrode terminal and said capacitor negative electrode terminal are exposed.

6. The capacitor assembly for an alternator according to claim 5 wherein said second molding resin has a melting point higher than the molding temperature of said first molding resin.

7. The capacitor assembly for an alternator according to claim 5 wherein said first and second molding resins are identical resins.

8. The capacitor assembly for an alternator according to claim 1 wherein a bag-shaped cover prepared using a second molding resin is mounted to said capacitor component such that at least tip portions of said capacitor positive electrode terminal and said capacitor negative electrode terminal are exposed.

9. The capacitor assembly for an alternator according to claim 8 wherein said second molding resin has a melting point higher than the molding temperature of said first molding resin.

10. The capacitor assembly for an alternator according to claim 8 wherein said first and second molding resins are identical resins.

11. The capacitor assembly for an alternator according to claim 1 wherein:
    said positive terminal and said capacitor positive electrode terminal are prepared using a single metal material; and
    said negative terminal and said capacitor negative electrode terminal are prepared using a single metal material.

12. A method for manufacturing a capacitor assembly for an alternator, comprising the step of molding a positive terminal, a negative terminal, and a capacitor component using a first molding resin to integrally mold, said capacitor component having a capacitor positive electrode terminal and a capacitor negative electrode terminal for electrical connection to said positive terminal and said negative terminal, and being installed between a battery terminal end and ground.

13. The method for manufacturing a capacitor assembly for an alternator according to claim 12, further comprising the step of connecting said positive terminal and said capacitor positive electrode terminal and connecting said negative terminal and said capacitor negative electrode terminal before said molding step.

14. The method for manufacturing a capacitor assembly for an alternator according to claim 13, further comprising the step of premolding said capacitor component using a second molding resin before said connecting step such that at least tip portions of said capacitor positive electrode terminal and said capacitor negative electrode terminal are exposed.

15. The method for manufacturing a capacitor assembly for an alternator according to claim 13, further comprising the step of mounting to said capacitor component a bag-shaped cover composed of a second molding resin before said connecting step such that at least tip portions of said capacitor positive electrode terminal and said capacitor negative electrode terminal are exposed.

16. The method for manufacturing a capacitor assembly for an alternator according to claim 12, wherein connection portions between said positive terminal and said capacitor positive electrode terminal and between said negative terminal and said capacitor negative electrode terminal are molded integrally in said molding step so as to be exposed from said first molding resin:

the method further comprising the step of connecting the connection portions of said positive terminal and said capacitor positive electrode terminal and connecting the connection portions of said negative terminal and said capacitor negative electrode terminal following said molding step.

17. The method for manufacturing a capacitor assembly for an alternator according to claim 16, further comprising the step of embedding said connection portions between said positive terminal and said capacitor positive electrode terminal and between said negative terminal and said capacitor negative electrode terminal using an elastic resin following said connecting step.

18. The method for manufacturing a capacitor assembly for an alternator according to claim 12, wherein said positive terminal, said capacitor positive electrode terminal, said negative terminal and said capacitor negative electrode terminal are linked by means of a linking portion to form a terminal member composed of a single metal material, said terminal member being molded integrally in said molding step so as to expose a portion of said linking portion from said first molding resin:

the method further comprising the step of cutting the potion of said linking portion exposed from said first molding resin following said molding step.

* * * * *